US012671297B2

(12) United States Patent
Peng

(10) Patent No.: US 12,671,297 B2
(45) Date of Patent: Jun. 30, 2026

(54) NOISE REDUCTION AND SHOCK ABSORPTION STRUCTURE OF TUBULAR MOTOR

(71) Applicant: Harda Intelligent Technologies Co., Ltd., Fujian (CN)

(72) Inventor: KeSheng Peng, Fujian (CN)

(73) Assignee: Harda Intelligent Technologies Co., Ltd., Fujian (CN)

( * ) Notice: Subject to any disclaimer, the term of this patent is extended or adjusted under 35 U.S.C. 154(b) by 234 days.

(21) Appl. No.: 18/703,371

(22) PCT Filed: Aug. 3, 2022

(86) PCT No.: PCT/CN2022/109976
§ 371 (c)(1),
(2) Date: Apr. 22, 2024

(87) PCT Pub. No.: WO2024/026731
PCT Pub. Date: Feb. 8, 2024

(65) Prior Publication Data
US 2025/0239909 A1 Jul. 24, 2025

(51) Int. Cl.
*H02K 5/24* (2006.01)
*E05F 15/668* (2015.01)
(Continued)

(52) U.S. Cl.
CPC .............. *H02K 5/24* (2013.01); *F16H 57/02* (2013.01); *H02K 7/116* (2013.01); *E05F 15/668* (2015.01);
(Continued)

(58) Field of Classification Search
CPC ...... H02K 5/24; H02K 7/116; H02K 2207/03; H02K 7/00; H02K 7/10; F16H 57/02;
(Continued)

(56) References Cited

FOREIGN PATENT DOCUMENTS

CN 215897475 U * 2/2022

* cited by examiner

*Primary Examiner* — Joseph Ortega
(74) *Attorney, Agent, or Firm* — Birchwood IP

(57) ABSTRACT

Disclosed in the present invention is a noise reduction and shock absorption structure of a tubular motor, comprising a motor housing, a motor body, an output support and a first shock absorption assembly. The motor body is arranged in the motor housing, and the front end of the motor body is connected to a transmission shaft. The output support is fixed at the front end of the motor housing, and is matched with an output shaft. The transmission shaft and the output shaft are in transmission connection by means of the first shock absorption assembly. The first shock absorption assembly comprises a first adapter and a second adapter which are rigid, as well as a first buffer sleeve and a second buffer sleeve which are soft. The transmission shaft, the first adapter, the second adapter and the output shaft are successively in key joint. The first buffer sleeve sleeves on the peripheral surface of the transmission shaft. The input end of the first adapter sleeves on the first buffer sleeve. The second buffer sleeve sleeves on the peripheral surface and the end surface of the output end of the first adapter. The second adapter sleeves on the second buffer sleeve, and allows the end part of the output shaft to abut against the end surface of the second buffer sleeve. The present invention achieves better noise reduction and shock absorption effects, thereby improving the quality of tubular motors.

13 Claims, 6 Drawing Sheets

(51) Int. Cl.
*F16H 57/02*          (2012.01)
*H02K 7/116*          (2006.01)
(52) U.S. Cl.
CPC ...  *E05Y 2201/434* (2013.01); *E05Y 2900/132*
(2013.01); *F16H 2057/02034* (2013.01); *F16H*
*2057/02073* (2013.01); *H02K 2207/03*
(2013.01)
(58) Field of Classification Search
CPC . F16H 2057/02034; F16H 2057/02073; F16H
57/023; F16H 57/028; E05F 15/668;
E05Y 2201/434; E05Y 2900/132; E06B
2009/725; E06B 9/72; F16D 3/06; F16F
15/124
See application file for complete search history.

NOISE REDUCTION AND SHOCK ABSORPTION STRUCTURE OF TUBULAR MOTOR

TECHNICAL FIELD

The present invention relates to the technical field of tubular motors, in particular to a noise reduction and shock absorption structure for a tubular motor.

BACKGROUND OF THE INVENTION

A tubular motor consists of three main sections: stroke, motor, and deceleration, and it is named as "tubular motor" because these three sections work inside a circular tube. The stroke section controls the upper and lower limits of the motor, the motor section is responsible for motor rotation, while the deceleration section mostly uses planetary reduction to slow down the motor speed and increase output torque.

Tubular motors are mainly used for electric rolling doors, where the motor is hidden inside a rolling tube. As the motor rotates, it drives a transmission shaft to rotate and thus roll up or down the curtain of the electric rolling door. When being rolled up, the curtain is wound on the rolling shaft; when being rolled down, the curtain slides down along an inner side of a guide rail. The curtain is controlled to be rolled up or down or halt during the up-down rolling process through a remote controller.

During operation of a tubular motor, high-speed rotation of the motor will produce vibration, which will be transmitted to the motor housing and causes vibration and noise, thereby creating a bad user's experience. A current solution is to provide a buffer piece between the motor and the motor casing to absorb the vibration. However, this only solves the problem of vibration transmission between the motor and the motor casing. In fact, an output shaft of the motor is also rigidly connected to an output support, which potentially results in vibrations depending on precision of assembly. Therefore, the noise reduction effect of the existing tubular motors is still not ideal enough to be applied to scenarios where a quiet operation is required.

BRIEF SUMMARY OF THE INVENTION

Technical Problem

The present invention aims to provide a noise reduction and shock absorption structure for a tubular motor, which achieves better noise reduction and shock absorption effects, thus improving the quality of the tubular motor.

Solution to the Technical Problem

Technical Solution

To achieve the above objects, the present invention provides the following technical solution: A noise reduction and shock absorption structure for a tubular motor, comprising a motor housing, a motor body, an output support, and a first damping assembly; the motor body is provided inside the motor housing; a front end of the motor body is connected to a transmission shaft for motion transmission; the output support is fixed at a front end of the motor housing, and an output shaft is rotationally engaged on the output support; the transmission shaft is connected with the output shaft for motion transmission through the first damping assembly; the first damping assembly comprises a first rotating joint and a second rotating joint made of hard material, and a first buffer sleeve and a second buffer sleeve made of soft material; the transmission shaft, the first rotating joint, the second rotating joint, and the output shaft are sequentially spline-connected to achieve motion transmission from the motor body to the output shaft; the first buffer sleeve sleeves a circumferential surface of the transmission shaft; an input end of the first rotating joint sleeves the first buffer sleeve; the second buffer sleeve sleeves a circumferential surface of an output end of the first rotating joint and also covers an end surface of the output end of the first rotating joint; the second rotating joint sleeves the second buffer sleeve, and one end of the output shaft abuts against an end surface of the second buffer sleeve.

The hard material is metal or high-strength plastics; the soft material is rubber or silicone.

A reduction device is provided at an output end of the motor body; an input end and an output end of the reduction device are connected to a rotating shaft of the motor body and the transmission shaft respectively for motion transmission.

The reduction device is a planetary gearbox.

A hole is formed at an axis of the output support; the output shaft passes through the hole and is movable within the hole, and a plurality of damping rings are provided between a circumferential surface of the output shaft and an inner wall of the hole.

The input end of the first rotating joint is a spline hole, and shapes of both the transmission shaft and the first buffer sleeve correspond to that of the spline hole.

The output end of the first rotating joint is a spline head, and a shape of the second buffer sleeve corresponds to that of the spline head; a spline groove is recessed from an end surface of the second rotating joint facing towards the first rotating joint, and a through hole which the output shaft passes through is formed on a bottom wall of the spline groove; a limiting block is provided at said one end of the output shaft; limiting grooves allowing axial sliding of the limiting block into the spline groove during assembly are formed on side walls of the spline groove, and the limiting grooves extend up to the bottom wall of the spline groove.

Preferably, the second buffer sleeve is formed by a circumferential surface buffer sleeve and an end surface buffer pad independent from each other; the circumferential surface buffer sleeve constitutes a circumferential surface of the second buffer sleeve, and the end surface buffer pad constitutes an end surface of the second buffer sleeve; a length of the circumferential surface buffer sleeve is greater than a length of the spline head.

A second damping assembly is provided at a rear end of the motor body; the second damping assembly comprises a fixing seat and a silicone block; the fixing seat is fixedly connected to an inner wall of the motor housing; two ends of the silicone block are connected to the rear end of the motor body and the fixing seat respectively.

A third damping assembly is provided between a circumferential surface of the motor body and the inner wall of the motor housing; the third damping assembly comprises a sealing tube sleeving the motor body.

Preferably, the third damping assembly further comprises a plurality of damping sleeves sleeving around the sealing tube; the damping sleeves are elastically engaged between a circumferential surface of the sealing tube and the inner wall of the motor housing.

Preferably, a plurality of annular position limiting grooves accommodating the damping sleeves are formed on the circumferential surface of the sealing tube.

Preferably, a plurality of stripes oriented along an axial direction of the tubular motor are formed on a circumferential surface of each of the damping sleeves, and the stripes are formed on the circumferential surface of each of the damping sleeves in form of projections or recesses.

Beneficial Effects of the Present Invention

Beneficial Effects

According to the above technical solution, the present invention has the following technical effects: 1) The present invention provides the first damping assembly between the transmission shaft and the output shaft, and the first damping assembly comprises the first rotating joint and the second rotating joint which are spline-connected between the transmission shaft and the output shaft, thereby achieving a three-stage motion transmission mechanism (firstly from the transmission shaft of the motor body to the first rotating joint, secondly from the first rotating joint to the second rotating joint, and thirdly from the second rotating joint to the output shaft) from the motor body to the output shaft. The first buffer sleeve and the second buffer sleeve are elastically engaged in the three-stage motion transmission mechanism between the transmission shaft and the first rotating joint and between the first rotating joint to the second rotating joint respectively, and provide motion transmission and provide buffering and damping effects in different motion transmission stages. Compared to the completely rigid connections between the motor body and the output support in a conventional structure to provide motion transmission, the three-stage transmission mechanism allows elastic engagements of the first buffer sleeve and the second buffer sleeve therein during motion transmission to effectively reduce or even eliminate vibration and avoid the generation of noise when motion is transmitted through the first buffer sleeve and the second buffer sleeve. 2) The transmission shaft, the first rotating joint, and the second rotating joint are sequentially connected by sleeve connections so that the whole structure can bear force more stably and provide higher structural strength, and thus the operating stability of the product is improved. 3) The second buffer sleeve is capable of providing buffering and damping effects between the circumferential surface of the output end of the first rotating joint and the second rotating joint, as well as providing buffering and damping effects between the output shaft and the first rotating joint. The second buffer sleeve absorbs the vibration generated by the first rotating joint along both a radial direction and an axial direction thereof, isolating the vibration of the first rotating joint and preventing it from being transmitted to the output support which is in rigid contact with the motor housing, thus providing a better damping effect for the product.

BRIEF DESCRIPTION OF THE DRAWINGS

Drawing Description

REFERENCE NUMERALS IN THE FIGURES

Figure 1:
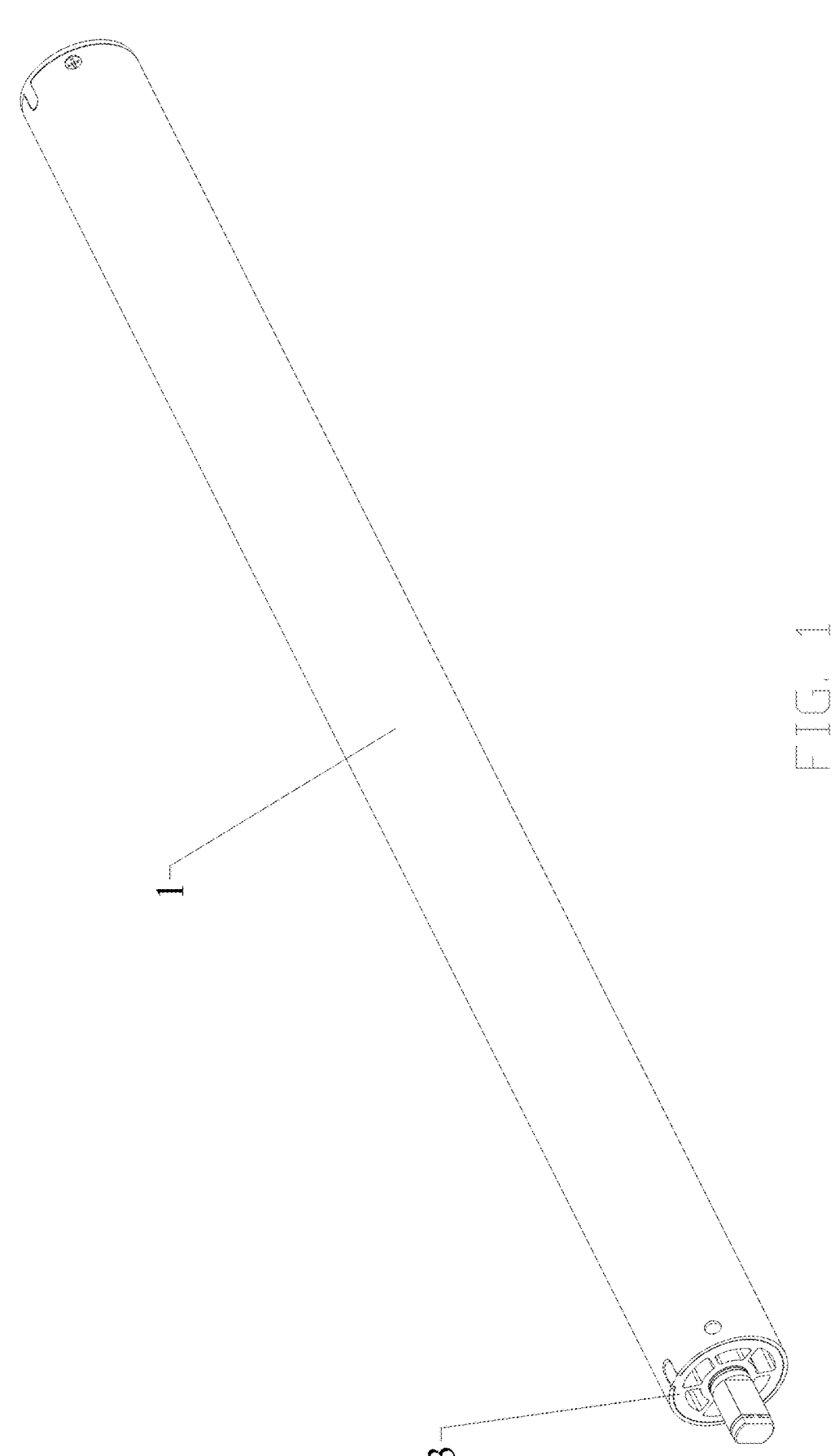
FIG. 1 is a perspective view of a specific embodiment according to the present invention.

1—motor housing;
2—motor body;
21—rotating shaft;
3—output support;
31—hole;
4—first damping assembly;
41—first rotating joint;
411—spline hole;
412—spline head;
42—second rotating joint;
421—spline groove;
422—through hole;
423—limiting groove;
43—first buffer sleeve;
44—second buffer sleeve;
441—circumferential surface buffer sleeve;
442—end surface buffer pad;
5—transmission shaft;
6—output shaft;
61—limiting block;
7—reduction device;
8—damping ring;
9—second damping assembly;
91—fixing seat;
92—silicone block;
10—third damping assembly;
101—sealing tube;
1011—annular position limiting groove;
102—damping sleeve;
1021—stripe.

DETAILED DESCRIPTION OF THE INVENTION

Embodiments of the Present Invention

To further explain the technical solution of the present invention, a detailed description of the present invention is provided below through specific embodiments.

In order to make the objects, technical solution, and advantages of the embodiments of the present invention clearer, the technical solution in the embodiments of the present invention will be clearly and thoroughly described with reference to the drawings in the embodiments of the present invention. It is obvious that the described embodiments are some, but not all, embodiments of the present invention. Generally, the components in the embodiments of the present invention described and illustrated in the drawings herein may be arranged and designed in a wide variety of different configurations.

Thus, the detailed description provided below for the embodiments of the present invention with reference to the drawings is not intended to limit the scope of protection sought for the present invention. Instead, it is merely representative of exemplary embodiments of the present invention. Based on the embodiments of the present invention, all other embodiments obtained by those of ordinary skills in the art without inventive efforts shall fall within the protection scope of the present invention.

It should be noted that similar reference numerals and letters refer to similar items in the drawings, and thus, once an item is defined in one figure, it need not be further defined or explained in the subsequent drawings.

In the description of the embodiments of the present invention, it should be understood that the indicated orientations or positional relationships are based on the orientations or positional relationships shown in the drawings. They may also represent the orientations or positional relationships commonly assumed when using the product of the present invention, or the orientations or positional relationships that are generally understood by those skilled in the art. These orientations or positional relationships are merely simplified for the ease of describing the embodiments of the present invention and are not intended to indicate or imply that the indicated devices or elements must have a particular orientation, be constructed and operated in a particular orientation. Therefore, such terms shall not be construed as limiting the present invention.

In addition, terms like "first", "second", and "third" are only for the purpose of description, and may not be construed as indicating or implying the relative importance or implicitly indicating the number of technical features indicated. Thus, features defined by "first" and "second" may explicitly or implicitly include one or more of the features. In the description of the present invention, the term "plurality" refers to two or more, unless otherwise explicitly and specifically defined.

In the description of the embodiments of the present invention, it should be further noted that unless otherwise explicitly specified or limited, the terms like "arrange," "mount," "connect," and "link" should be interpreted in a broad sense. For example, it may be a fixed connection, a detachable connection, or an integrated connection; it may be a mechanical connection, an electric connection, or in communication with each other; or it may be a direct connection, an indirect connection by means of an intermediate, an internal communication between two elements, or an interaction between two elements. For those of ordinary skill in the art, the specific meanings of the above terms in the present invention can be construed according to specific contexts.

In the present invention, unless otherwise specified and limited, a first feature "on" or "under" a second feature may include the first and second features being in direct contact, and may also include the first and second features being not in direct contact but being in contact via another feature between them. Moreover, a first feature "on top of", "above", and "over" a second feature includes a first feature being directly above and obliquely above a second feature, or simply indicating that the horizontal height of a first feature is higher than that of a second feature. A first feature "beneath", "underneath", and "below" a second feature includes a first feature being directly under and obliquely under a second feature, or simply indicating that the horizontal height of a first feature is lower than that of a second feature.

The following disclosure provides many different embodiments or examples for implementing different structures of the present invention. To simplify the disclosure of the present invention, components and arrangements in specific examples are described below. Of course, they are merely examples and are not intended to limit the present invention. In addition, the present invention may repeat reference numerals and/or reference letters in different examples, and such repetition is for the purposes of simplicity and clarity and does not indicate a relationship between the variety of embodiments and/or arrangements discussed.

In addition, the present invention provides examples of various specific processes and materials, but those of ordinary skills in the art may be aware of the application of other processes and/or the use of other materials.

Figure 2:
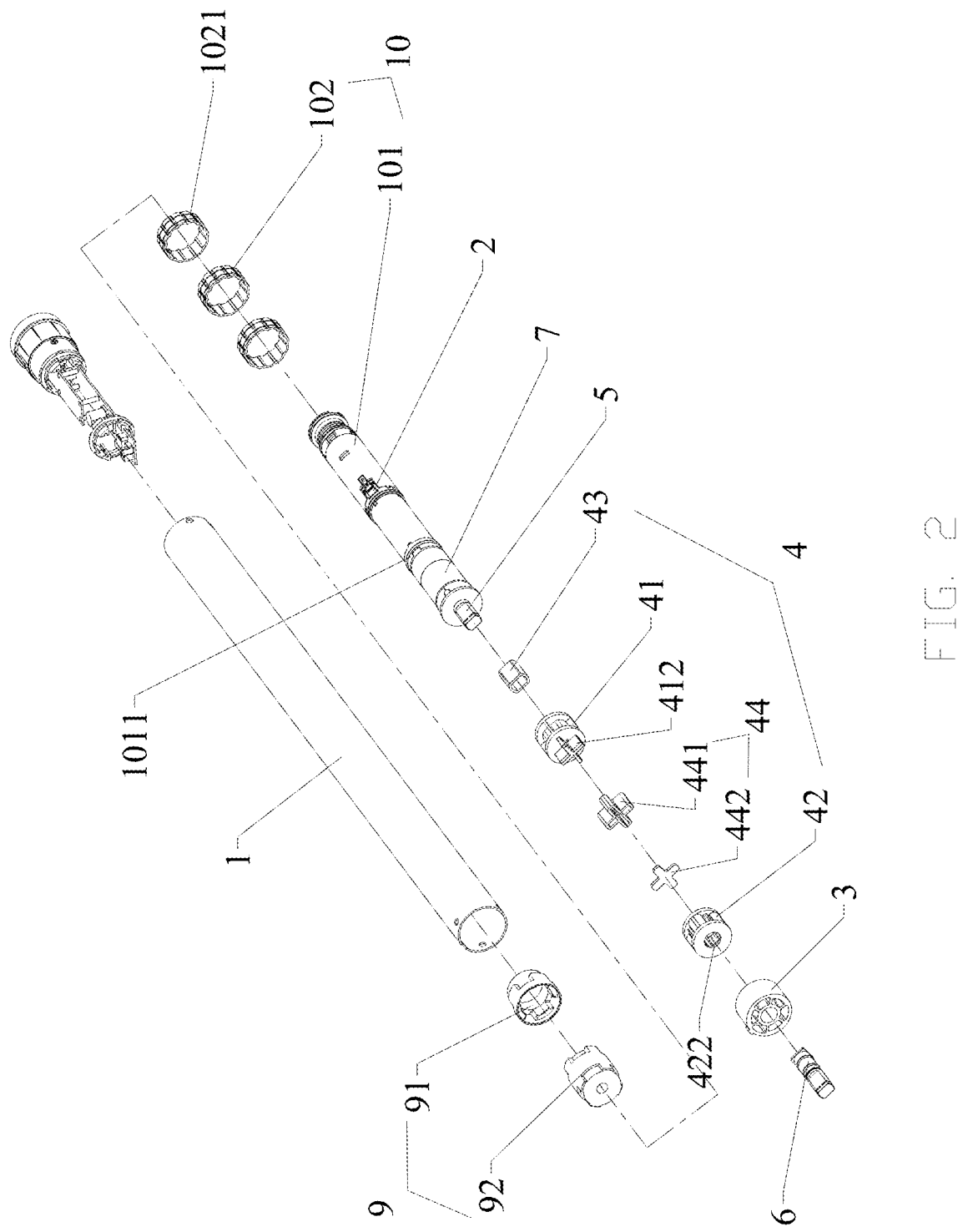
FIG. 2 is an exploded view of a specific embodiment according to the present invention.
Figure 3:
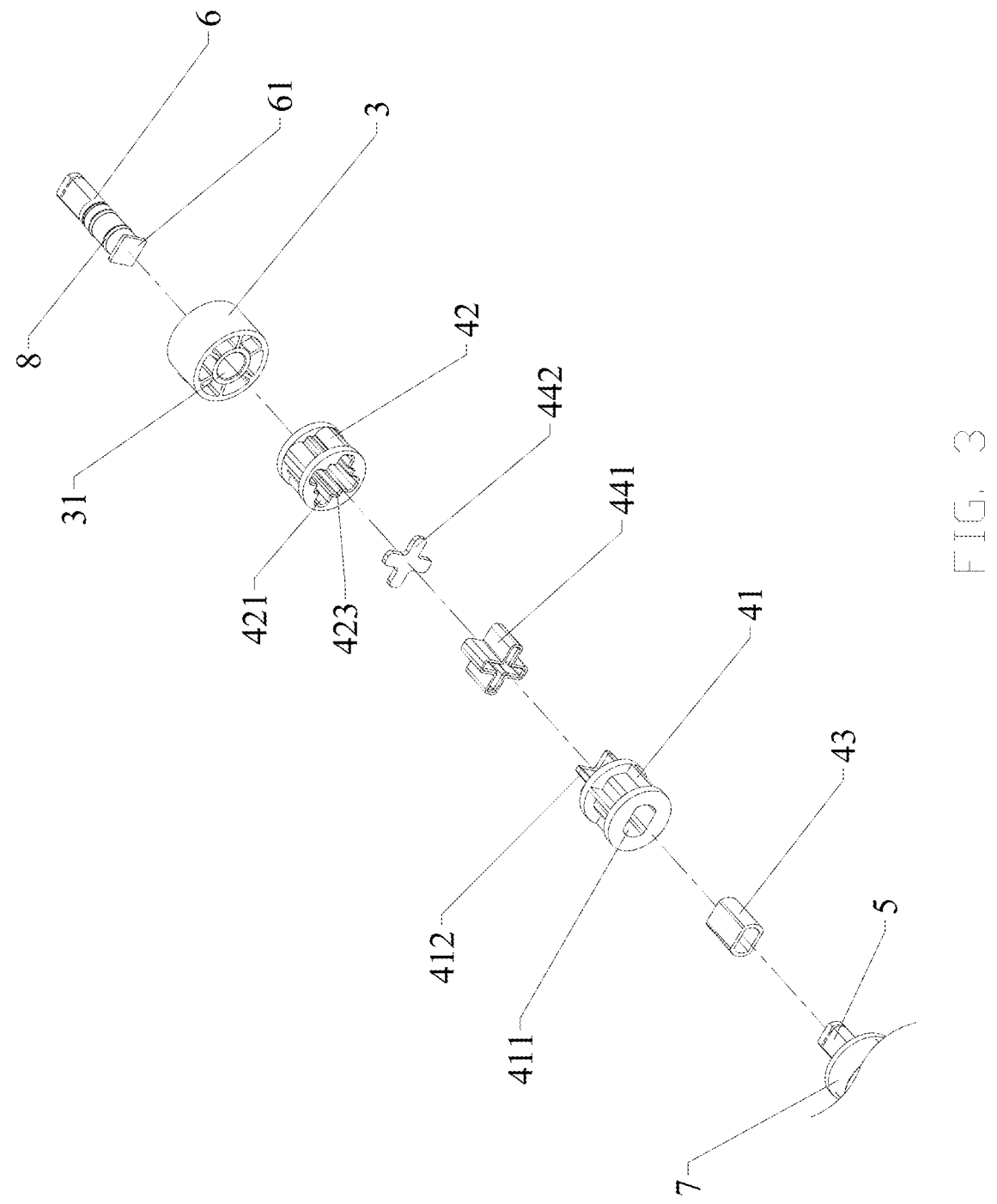
FIG. 3 is an exploded view of a first damping assembly of a specific embodiment according to the present invention.
Figure 4:
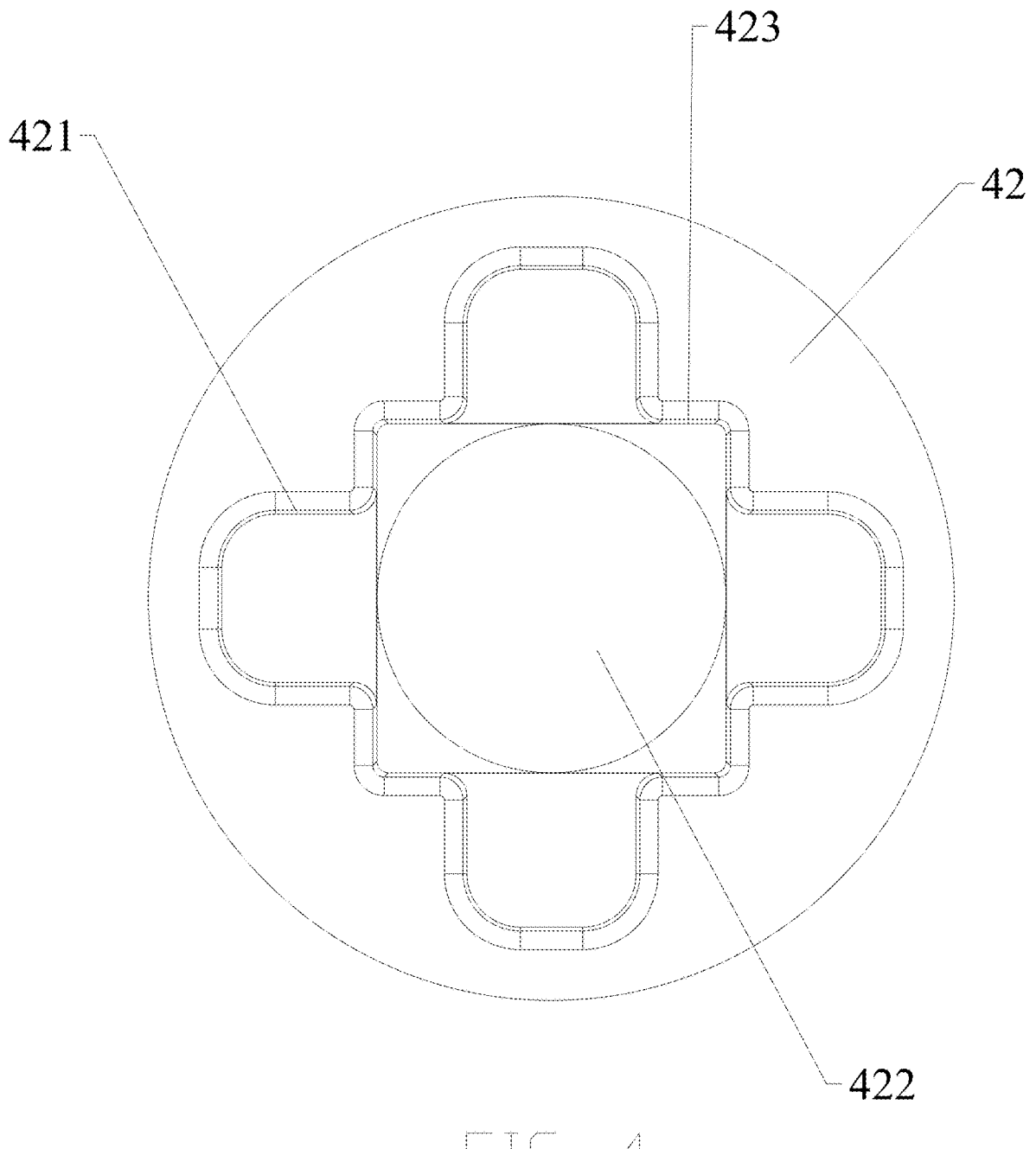
FIG. 4 is a front view of a second rotating joint of a specific embodiment according to the present invention.
Figure 5:
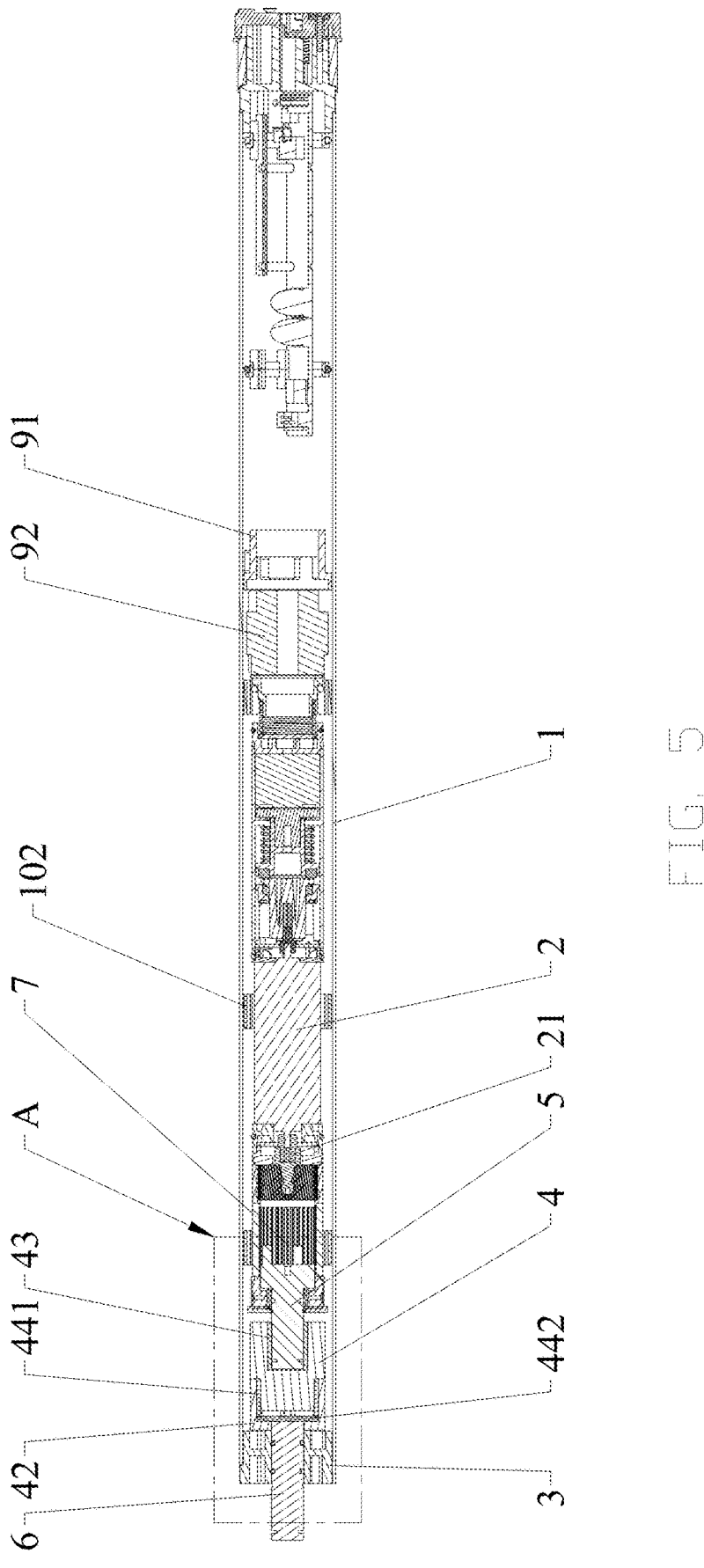
FIG. 5 is a cross-sectional view of a specific embodiment according to the present invention.
Figure 6:
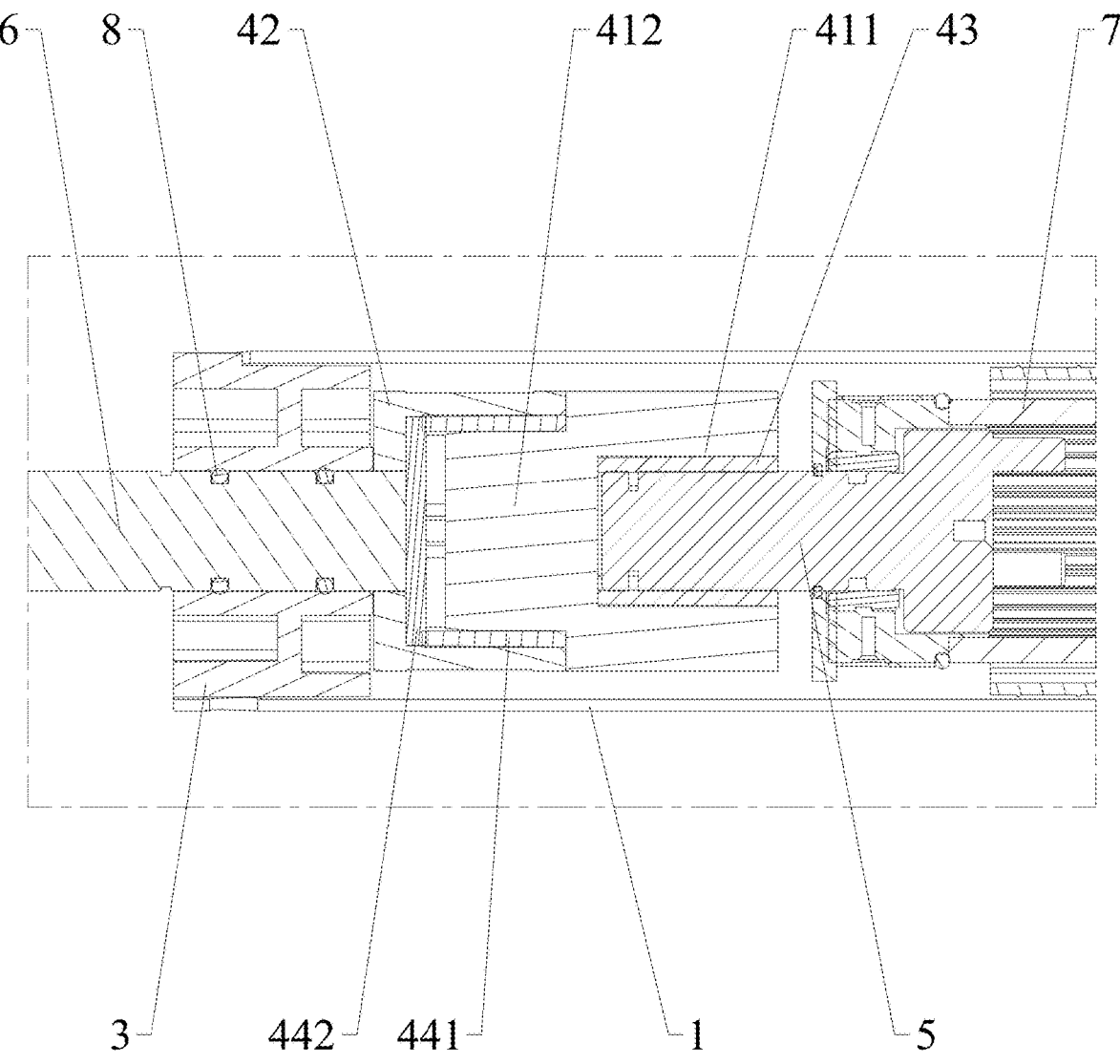
FIG. 6 is an enlarged view of portion A in FIG. 5.

Referring to FIGS. 1 to 6, the present invention discloses a noise reduction and shock absorption structure for a tubular motor, comprising a motor housing 1, a motor body 2, an output support 3, and a first damping assembly 4; the motor body 2 is provided inside the motor housing 1; a front end of the motor body 2 is connected to a transmission shaft 5 for motion transmission; the output support 3 is fixed at a front end of the motor housing 1, and an output shaft 6 (which is configured to connect an external device driven by the tubular motor, such as a curtain of a roller door) is rotationally engaged on the output support 3; the transmission shaft 5 is connected with the output shaft 6 for motion transmission through the first damping assembly 4; the first damping assembly 4 comprises a first rotating joint 41 and a second rotating joint 42 made of hard material, and a first buffer sleeve 43 and a second buffer sleeve 44 made of soft material; the transmission shaft 5, the first rotating joint 41, the second rotating joint 42, and the output shaft 6 are sequentially spline-connected to achieve motion transmission from the motor body 2 to the output shaft 6; the first buffer sleeve 43 sleeves a circumferential surface of the transmission shaft 5; an input end of the first rotating joint 41 sleeves the first buffer sleeve 43; the second buffer sleeve 44 sleeves a circumferential surface of an output end of the first rotating joint 41 and also covers an end surface of the output end of the first rotating joint 41; the second rotating joint 42 sleeves the second buffer sleeve 44, and one end of the output shaft 6 abuts against an end surface of the second buffer sleeve 44.

The following describes the specific embodiments of the present invention.

The hard material refers to a relatively rigid material such as metal, high-strength plastics, and the like; the soft material refers to a relatively soft and elastic material such as rubber or silicone.

A reduction device 7 is provided at an output end of the motor body 2; an input end and an output end of the reduction device 7 are connected to a rotating shaft 21 of the motor body 2 and the transmission shaft 5 respectively for motion transmission. In other words, the transmission shaft 5 is connected to the motor body 2 for motion transmission through the reduction device 7. This arrangement achieves a decelerated motion transmission from the motor body 2 to the transmission shaft 5, increases torque, and better accommodates the conventional usage requirements of the tubular motor.

Furthermore, the reduction device 7 is a planetary gearbox, which provides smooth transmission, high load-bearing capacity, and a large transmission ratio within a compact size, making it suitable for tubular motors that have similar requirements for a small volume.

A hole 31 is formed at an axis of the output support 3; the output shaft 6 passes through the hole 31 and is movable within the hole 31, and a plurality of damping rings 8 are provided between a circumferential surface of the output shaft 6 and an inner wall of the hole 31. The damping rings 8 are elastically configured between the output shaft 6 and the output support 3, preventing completely rigid contact between the output shaft 6 and the output support 3. This reduces the impact on the output support 3 when the output shaft 6 rotates, thereby reducing the noise generated by the product.

The input end of the first rotating joint 41 is a spline hole 411, and shapes of both the transmission shaft 5 and the first buffer sleeve 43 correspond to the spline hole 411. In this embodiment, cross-sectional shapes of the spline hole 411, the transmission shaft 5, and the first buffer sleeve 43 are all in a shape of an elongated circle resembling an athletics track, that is, a shape consisting of a left vertical side and a right vertical side where corresponding first ends of the left vertical side and the right vertical side are connected by an upper arc while corresponding second ends of the left vertical side and the right vertical side are connected by a lower arc.

The output end of the first rotating joint 41 is a spline head 412, and a shape of the second buffer sleeve 44 corresponds to the spline head 412. In this embodiment, a cross-sectional shape of the spline head 412 is a cross shape; a spline groove 421 is recessed from an end surface of the second rotating joint 42 facing towards the first rotating joint 41, and a through hole 422 which the output shaft 6 passes through is formed on a bottom wall of the spline groove 421. Additionally, a limiting block 61 is provided at said one end of the output shaft 6, limiting grooves 423 allowing axial sliding of the limiting block 61 into the spline groove 421 during assembly are formed on side walls of the spline groove 421, and the limiting grooves 423 extend up to the bottom wall of the spline groove 421, thereby achieving assembly of the output shaft 6 within the second rotating joint 42. During assembly, the output shaft 6 is first inserted into the spline groove 421 from said end surface of the second rotating joint 42 facing towards the first rotating joint 41, so that the limiting block 61 slides on the limiting grooves 423, and then the output shaft 6 passes through the through hole 422, and the limiting block 61 comes into contact with the bottom wall of the spline groove 421, then the spline head 412 sleeved by the second buffer sleeve 44 is inserted into the spline groove 421 and abuts against the limiting block 61, thereby achieving sequential spline connection of the first rotating joint 41, the second rotating joint 42, and the output shaft 6.

Furthermore, the second buffer sleeve 44 is formed by a circumferential surface buffer sleeve 441 and an end surface buffer pad 442 independent from each other; the circumferential surface buffer sleeve 441 constitutes a circumferential surface of the second buffer sleeve 44, and the end surface buffer pad 442 constitutes an end surface of the second buffer sleeve 44; a length of the circumferential surface buffer sleeve 441 is greater than a length of the spline head 412 so that a clearance exists between the end surface buffer pad 442 and the spline head 412. During assembly, the circumferential surface buffer sleeve 441 pushes the end surface buffer pad 442 towards the bottom wall of the spline groove 421 until the end surface buffer pad 442 contacts the limiting block 61 and the circumferential surface buffer sleeve 441 abuts against the end surface buffer pad 442 to fix a position of the end surface buffer pad 442. A clearance exists between the spline head 412 and the end surface buffer pad 442 so that an end portion of the circumferential surface buffer sleeve 441 is allowed for greater deformation to achieve better shock absorption effect. Additionally, with the air between the spline head 412 and the end surface buffer pad 442, noise is absorbed during propagation, thereby achieving the purpose of noise reduction.

A second damping assembly 9 is provided at a rear end of the motor body 2; the second damping assembly 9 comprises a fixing seat 91 and a silicone block 92. The fixing seat 91 is fixedly connected to an inner wall of the motor housing 1; two ends of the silicone block 92 are connected to the rear end of the motor body 2 and the fixing seat 91 respectively, thereby achieving a fixed connection between the rear end of the motor body 2 and the motor housing 1. The silicone block 92 serves to dampen the vibration between the two.

A third damping assembly 10 is provided between a circumferential surface of the motor body 2 and the inner wall of the motor housing 1; the third damping assembly 10 comprises a sealing tube 101 sleeving the motor body 2. This ensures that the noise generated during the operation of the motor body 2 is contained within the sealing tube 101, thereby effectively reducing the noise.

Furthermore, the third damping assembly 10 further comprises a plurality of damping sleeves 102 sleeving around the sealing tube 101. The damping sleeves 102 are elastically engaged between a circumferential surface of the sealing tube 101 and the inner wall of the motor housing 1 to absorb the vibration generated by the motor body 2 during operation so as to prevent the motor body 2 from impacting (striking) the motor housing 1 and generating noise.

Moreover, a plurality of annular position limiting grooves 1011 accommodating the damping sleeves 102 are formed on the circumferential surface of the sealing tube 101 to define installation positions of the damping sleeves 102, preventing any displacement of the damping sleeves 102 caused by vibration generated during operation of the motor body 2 and ensuring the functional stability of the damping sleeves 102.

Moreover, a plurality of stripes 1021 oriented along an axial direction of the tubular motor are formed on a circumferential surface of each of the damping sleeves 102, and the stripes 1021 are formed on the circumferential surface of each of the damping sleeves 102 in form of projections or recesses to create through channels with openings at two ends of each through channel between the damping sleeves 102 and the inner wall of the motor housing 1 to prevent the damping sleeves 102 from being fully attached to or in contact with the inner wall of the motor housing 1, and air within the through channels can be utilized to achieve sound attenuation and noise reduction.

Through the aforementioned solution, the present invention provides the first damping assembly 4 provided between the transmission shaft 5 and the output shaft 6, and the first damping assembly 4 comprises the first rotating joint 41 and the second rotating joint 42 which are spline-connected between the transmission shaft 5 and the output shaft 6, thereby achieving a three-stage motion transmission mechanism (firstly from the transmission shaft 5 of the motor body 2 to the first rotating joint 41, secondly from the first rotating joint 41 to the second rotating joint 42, and thirdly from the second rotating joint 42 to the output shaft 6) from the motor body 2 to the output shaft 6. The first buffer sleeve 43 and the second buffer sleeve 44 are elastically engaged in the three-stage motion transmission mechanism between the transmission shaft 5 and the first rotating joint 41 and between the first rotating joint 41 to the second rotating joint 42 respectively, and provide motion transmission and provide buffering and damping effects in different motion transmission stages. Compared to the completely rigid connections between the motor body 2 and the output support 3 in a conventional structure to provide motion transmission, the three-stage transmission mechanism allows elastic engagements of the first buffer sleeve 43 and the second buffer sleeve 44 therein during motion transmission to effectively reduce or even eliminate vibration and avoid the generation of noise when motion is transmitted through the first buffer sleeve 43 and the second buffer sleeve 44. The transmission shaft 5, the first rotating joint 41, and the second rotating joint 42 are sequentially connected by sleeve connections so that the whole structure can bear force more stably and provide higher structural strength, and thus the operating stability of the product is improved. The second buffer sleeve 44 is capable of providing buffering and damping effects between the circumferential surface of the output end of the first rotating joint 41 and the second rotating joint 42, as well as providing buffering and damping effects between the output shaft 6 and the first rotating joint 41. The second buffer sleeve 44 absorbs the vibration generated by the first rotating joint 41 along both a radial direction and an axial direction thereof, isolating the vibration of the first rotating joint 41 and preventing it from being transmitted to the output support 3 which is in rigid contact with the motor housing 1, thus providing a better damping effect for the product.

The above embodiments and illustrations are not intended to limit the form and style of the product of the present invention. Any appropriate variations or modifications made by those of ordinary skills in the art within the scope of the present invention shall be considered as falling within the scope of the patent.

What is claimed is:

1. A noise reduction and shock absorption structure for a tubular motor, comprising a motor housing, a motor body, an output support, and a first damping assembly;

the motor body is provided inside the motor housing; a front end of the motor body is connected to a transmission shaft for motion transmission; the output support is fixed at a front end of the motor housing, and an output shaft is rotationally engaged on the output support; the transmission shaft is connected with the output shaft for motion transmission through the first damping assembly; wherein:

the first damping assembly comprises a first rotating joint and a second rotating joint made of hard material, and a first buffer sleeve and a second buffer sleeve made of soft material; the transmission shaft, the first rotating joint, the second rotating joint, and the output shaft are sequentially spline-connected to achieve motion transmission from the motor body to the output shaft; the first buffer sleeve sleeves a circumferential surface of the transmission shaft;

an input end of the first rotating joint sleeves the first buffer sleeve; the second buffer sleeve sleeves a circumferential surface of an output end of the first rotating joint and also covers an end surface of the output end of the first rotating joint; the second rotating joint sleeves the second buffer sleeve, and one end of the output shaft abuts against an end surface of the second buffer sleeve.

2. The noise reduction and shock absorption structure of claim 1, wherein the hard material is metal or high-strength plastics; the soft material is rubber or silicone.

3. The noise reduction and shock absorption structure of claim 1, wherein a reduction device is provided at an output end of the motor body; an input end and an output end of the reduction device are connected to a rotating shaft of the motor body and the transmission shaft respectively for motion transmission.

4. The noise reduction and shock absorption structure of claim 3, wherein the reduction device is a planetary gearbox.

5. The noise reduction and shock absorption structure of claim 1, wherein a hole is formed at an axis of the output support; the output shaft passes through the hole and is movable within the hole, and a plurality of damping rings are provided between a circumferential surface of the output shaft and an inner wall of the hole.

6. The noise reduction and shock absorption structure of claim 1, wherein the input end of the first rotating joint is a spline hole, and shapes of both the transmission shaft and the first buffer sleeve correspond to that of the spline hole.

7. The noise reduction and shock absorption structure of claim 1, wherein the output end of the first rotating joint is a spline head, and a shape of the second buffer sleeve corresponds to that of the spline head; a spline groove is recessed from an end surface of the second rotating joint facing towards the first rotating joint, and a through hole which the output shaft passes through is formed on a bottom wall of the spline groove: a limiting block is provided at said one end of the output shaft; limiting grooves allowing axial sliding of the limiting block into the spline groove during assembly are formed on side walls of the spline groove, and the limiting grooves extend up to the bottom wall of the spline groove.

8. The noise reduction and shock absorption structure of claim 7, wherein the second buffer sleeve is formed by a circumferential surface buffer sleeve and an end surface buffer pad independent from each other: the circumferential surface buffer sleeve constitutes a circumferential surface of the second buffer sleeve, and the end surface buffer pad constitutes an end surface of the second buffer sleeve; a length of the circumferential surface buffer sleeve is greater than a length of the spline head.

9. The noise reduction and shock absorption structure of claim 1, wherein a second damping assembly is provided at a rear end of the motor body; the second damping assembly comprises a fixing seat and a silicone block; the fixing seat is fixedly connected to an inner wall of the motor housing; two ends of the silicone block are connected to the rear end of the motor body and the fixing seat respectively.

10. The noise reduction and shock absorption structure of claim 1, wherein a third damping assembly is provided between a circumferential surface of the motor body and an inner wall of the motor housing; the third damping assembly comprises a sealing tube sleeving the motor body.

11. The noise reduction and shock absorption structure of claim 10, wherein the third damping assembly further comprises a plurality of damping sleeves sleeving around the sealing tube; the damping sleeves are elastically engaged between a circumferential surface of the sealing tube and the inner wall of the motor housing.

12. The noise reduction and shock absorption structure of claim 11, wherein a plurality of annular position limiting grooves accommodating the damping sleeves are formed on the circumferential surface of the sealing tube.

13. The noise reduction and shock absorption structure of claim 11, wherein a plurality of stripes oriented along an axial direction of the tubular motor are formed on a circumferential surface of each of the damping sleeves.

* * * * *